United States Patent [19]

Nam

[11] Patent Number: 4,990,812
[45] Date of Patent: Feb. 5, 1991

[54] SOLENOID TYPE ELECTRIC GENERATOR

[76] Inventor: Joong Nam, 206-40, jeongneung-dong, Seongbuk-gu, Seoul, Rep. of Korea, 136-102

[21] Appl. No.: 439,346

[22] Filed: Nov. 21, 1989

[30] Foreign Application Priority Data

Apr. 8, 1989 [KR] Rep. of Korea ............... 1989-4627

[51] Int. Cl.$^5$ .................... H02K 1/06; H02K 3/42
[52] U.S. Cl. .................................. 310/261; 310/62; 310/208; 310/254
[58] Field of Search ................ 310/14, 62, 68 R, 164, 310/185, 186, 187, 192, 194, 208, 216, 254, 261, 268

[56] References Cited

U.S. PATENT DOCUMENTS

| | | | |
|---|---|---|---|
| 1,417,913 | 5/1922 | Heyland | 310/169 |
| 1,838,010 | 12/1931 | Stocker | 310/127 |
| 2,274,070 | 2/1942 | Kauders | 310/212 |
| 3,493,800 | 2/1970 | Barrett | 310/168 |
| 3,534,204 | 10/1970 | Groezinger | 310/168 |
| 4,330,727 | 5/1982 | Oudet | 310/268 |
| 4,538,086 | 8/1985 | Marsh et al. | 310/258 |
| 4,757,225 | 7/1988 | Wolcott et al. | 310/171 |
| 4,835,431 | 5/1989 | Lindgren | 310/254 |

Primary Examiner—Steven L. Stephan
Assistant Examiner—D. L. Rebsch
Attorney, Agent, or Firm—Fleit, Jacobson, Cohn, Price, Holman & Stern

[57] ABSTRACT

An axially short solenoid type electric generator comprising a stator attached on the inner circumferential surface of the left half of a short cylindrical case, and a rotor accommodated within the right half of the case. The stator comprises U-shaped magnetic metal blocks attached along the inner circumferential surface of the left half of the case, angularly separated at predetermined intervals, an output conductor (coil) wound in a short solenoid through the slots of the blocks, and magnetic short circuit blocks disposed between the channel-shaped blocks. The rotor comprises a centrifugal fan, a cylindrical supporter, U-shaped magnetic material blocks attached around the cylindrical supporter, and a field coil wound through the slots of opposing U-shaped blocks. The electric generator reduces the resistance loss of the coils, and the eddy current loss and hysteresis loss of the magnetic metals. Further the generator of the present invention is light in weight compared with the conventional generator of the same capacity, and excludes the possibility of any faulty windings of the coils.

15 Claims, 4 Drawing Sheets

SOLENOID TYPE ELECTRIC GENERATOR

FIELD OF THE INVENTION

The present invention relates to an electric generator in which the stator coil and the rotor coil are respectively wound in a short solenoid and also to a combination of such generators installed on a same shaft axially separated.

BACKGROUND OF THE INVENTION

In the conventional coil electric generators, the conductors are wound in such a manner that the wound coils are disposed in the axial direction, such axially disposed lengths of the coils being the effective lengths of the coils for producing the electromotive force. In such generators, the effective lengths have to be sufficiently long if a sufficient electromotive force is to be obtained, but this long effective coil length means a long rotor length. This in turn requires a high precision shaft and shaft retaining means in large electric generators.

Further, in the conventional generators, the armature coils and the field coils, especially, the armature coils are wound in a zigzag type, and the winding method for the coils are very complicated. Therefore, if the worker for the manufacturing of the generator commits mistakenly a faulty winding, a fatal defect in the generator may result.

Further in the conventional generator, the steel core of the rotor unavoidably has a large mass due to its structural nature. Therefore, it is difficult to effectively cool the rotor, and if the rotor is driven at a high temperature, the temperature of the rotor coils is also elevated, so that the insulative coatings of the rotor coils should be deteriorated before long, thereby shortening the life expectancy of the rotor coils. Further, such a high temperature of the rotor coils causes the resistance of the rotor coils to be increased, with the result that the resistance loss for the rotor coils is increased, thereby squandering energy and lowering the efficiency of the generator.

Further, the large mass of the rotor as described above also causes the eddy current loss and the hysteresis loss to be increased, ultimately lowering the generator efficiency.

Further, the large mass of the steel core of the rotor not only means a wasting of material, but also brings an undesirable effect such as handling inconvenience due to the excessive weight.

Further, in the conventional generators, the steel core of the rotor is secured with the shaft as one piece, and the shaft can not be laminated. Therefore, the eddy current loss of the shaft may be large.

SUMMARY OF THE INVENTION

Therefore the present invention is intended to overcome all the above described disadvantages of the conventional generators by providing a novel type of electric generator.

It is an object of the present invention to provide a solenoid type electric generator in which the stator coil and the rotor coil (field coil) are respectively wound on a short solenoid and therefore, reducing the likelihood of faulty winding of the coils.

It is another object of the present invention to provide a solenoid type electric generator which has a short shaft which is advantageous in small which is medium ,and large size electric generators.

It is still another object of the present invention to provide a solenoid type electric generator in which the stator and rotor magnetic steel blocks (equivalent to the steel cores of the conventional electric generators) are made to have the minimum necessary masses so that the eddy current loss and the hysteresis loss is be kept at a minimum.

It is still another object of the present invention to provide a solenoid type electric generator in which the magnetic steel blocks are dispersingly arranged, the solenoid type coils are made to have many exposed areas, and a strong centrifugal fan is installed at a position, so that the stator and rotor coils can be operated at a low temperature, thereby lowering the resistance loss of the coils to improve the efficiency of the generator.

It is still another object of the present invention to provide a solenoid type electric generator in which the shaft is not substantially influenced by the magnetic field of the solenoid type coils because the shaft is positioned far away from the coils and substantially shielded by magnetic steel blocks, thereby preventing eddy current loss and hysteresis loss in the shaft.

It is still another object of the present invention to provide a solenoid type electric generator which has a light weight relative to its generating capacity, thereby providing handling convenience.

In achieving the above objects, the solenoid type electric generator of the present invention is constituted as described below. The inner circumferential surface of the left half portion of shaped a short cylindrical case is attached with a first plurality of channel shaped magnetic steel blocks at certain uniform angular intervals in such a manner that the openings of the slots of the blocks are oriented in the axial direction. Between the magnetic steel blocks, there are installed thick plate type magnetic short circuit blocks respectively in such a manner that the channel shaped magnetic steel blocks and the magnetic short circuit blocks are alternately arranged around the inner circumference of the left half of the short cylindrical case. In practice, before installing the magnetic short circuit blocks, stator coils are wound through the slots of the channel shaped magnetic steel blocks in a short soleniodal form, and then, the magnetic short circuit blocks are installed in the manner as described above, thereby completing the stator of the electric generator according to the present invention. Meanwhile, within the right half portion of the short cylindrical case, there is accommodated the rotor which consists of a shaft, a short cylindrical supporter made of a heat resistant high hardness synthetic resin and fixedly secured to the shaft, a second plurality of channel shaped magnetic steel blocks radially attached around the supporter, and field coils wound through the slots of the second plurality of channel shaped magnetic steel blocks in a short solenoidal form. In the space within the arrangement of the stator blocks (the first plurality of channel shaped magnetic blocks and the short magnetic circuit blocks), there is accommodated a strong centrifugal fan which is made of synthetic resin and integrally formed with the short cylindrical supporter, this centrifugal fan designed for cooling the different parts of the generator and for reinforcing the structural firmness of the short cylindrical supporter.

The first plurality channel shaped steel blocks and the magnetic short circuit steel blocks of the stator, and the second plurality channel shaped steel blocks of the rotor are laminated in a substantially radial-axial direction which is the direction perpendicular to the laminating direction of the conventional electric generators.

In the stator and rotor of the electric generator of the present invention, the first plurality channel shaped steel blocks are arranged at certain uniform angular intervals around the circumference, and the second plurality channel shaped steel blocks are also arranged in the same manner, while these two kinds of steel blocks should be equal in their numbers to each other, should correspond in their positions to each other, and should be identical in their opposing faces to each other.

BRIEF DESCRIPTION OF THE DRAWINGS

The above objects and other advantages of the present invention will become more apparent by describing in detail the preferred embodiments of the present invention with reference to the attached drawings in which.

DESCRIPTION OF THE PREFERRED EMBODIMENTS

Figure 1:
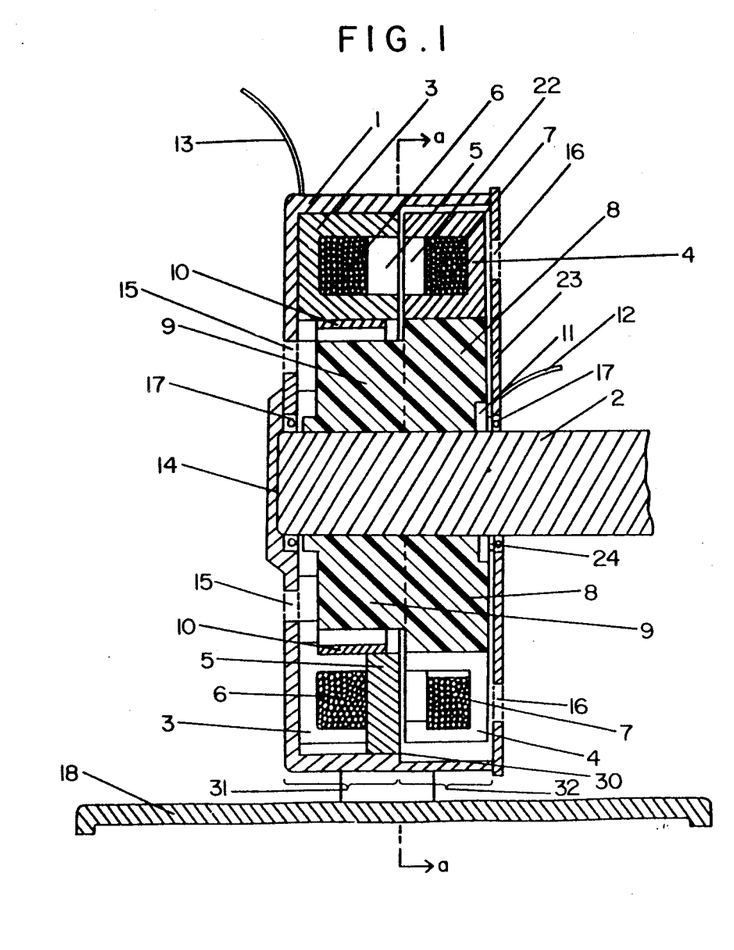
FIG. 1 is an axial sectional view of the solenoid type electric generator according to the present invention.

Referring to FIG. 1, a cap 23 is detachably attached to a case 1 to form a complete case of the generator according to the present invention, and the generator case is concentric to a shaft 2. The generator case is provided with an annular step 30. The thicker left portion of the case accommodating the stator and located to the left of the annular step 30 is a first length portion 31, while the thinner right portion of the case accommodating the rotor and located to the right of the annular step 30 is a second length portion 32.

The line a—a of FIG. 1 is an approximate boundary between the stator and the rotor of the solenoid type electric generator according to the present invention, the stator being installed on the inside of the case 1 to the left of the line a—a, and the rotor being accommodated within the case 1 to the right of the line a—a, while there is provided a minimum air gap between the stator and the rotor.

Figure 2:
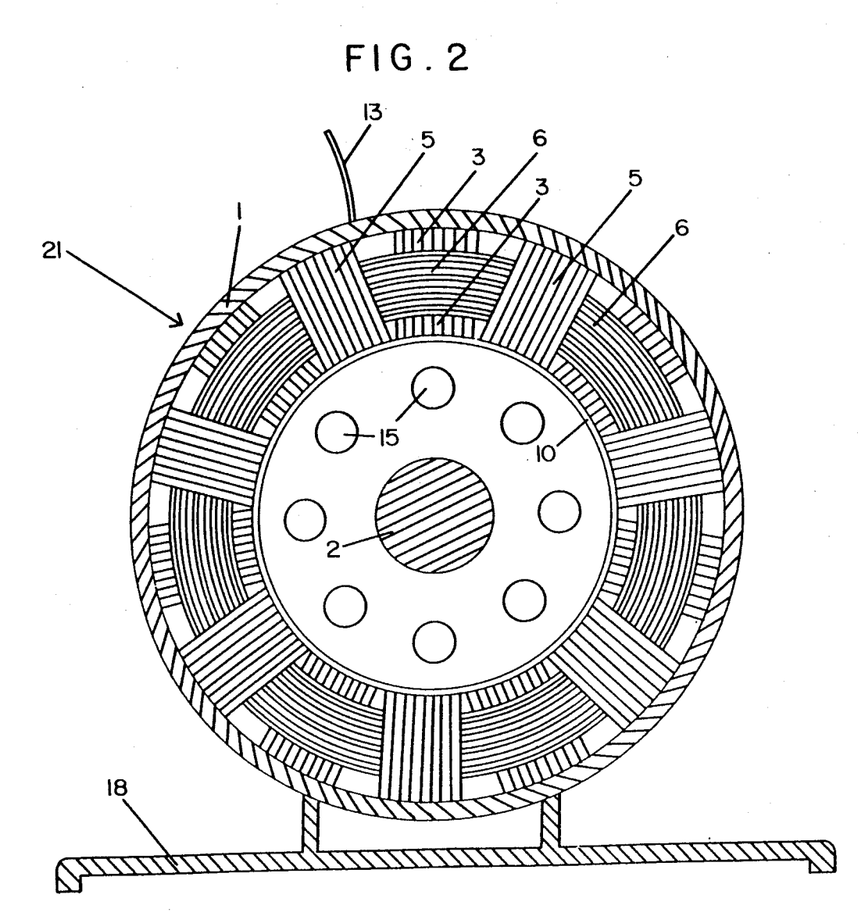
FIG. 2 is a sectional view taken along the line a—a of FIG. 1 as observed from the right hand side of FIG. 1, showing the stator of the electric generator according to the present invention.

The stator is generally indicated at 21 in FIG. 2, and this stator 21 will be described in detail below. A first plurality of channel-shaped (u-shaped) steel blocks 3 are fixedly attached on the inner circumference and on the left wall of the case 1 at certain uniform angular intervals, the attachings being done by means of fasteners, bolts and the like. Output coils 6 are wound through the slots of the first plurality of channel shaped magnetic steel blocks 3 in a short solenoidal form, and then, magnetic short circuit blocks 5 are installed between the steel blocks 3 respectively in such a manner that the magnetic short circuit blocks 5 rigidly support the side of the wound output coils (the stator coils) shown in (FIGS. 1 and 2). Further, the magnetic short circuit blocks 5 should be installed in such a manner that the right side faces of the first plurality of channel shaped steel blocks 3 and the magnetic short circuit blocks 5 are on the same plane, and both kinds of these blocks are laminated in an approximate radial-axial direction which is perpendicular to the laminating direction of the conventional electric generators. The laminating method is such that the laminas are bound by conventional means such as riveting, bolt-nut and the like. The blocks 3,5 can be made of the usual silicon steel, and the silicon content is adjustable depending on the size of the electric generator. As the material of the case 1 and the cap 23, non-ferrous metals such as aluminum are preferred in order to avoid the hysteresis loss due to stray magnetic flux, but in the case where the release of the magnetic flux to the outside is not desirable, steel has to be used. In order to reinforce the attachments of the channel shaped steel blocks 3 and the magnetic short circuit blocks 5, a support ring 10 is fixedly installed to connect the radial inner tips of the blocks 3,5, and as the material of this support ring 10, a heat resistant high hardness synthetic resin such as polyimide can be used. As described above, the stator 21 consists of a first plurality of the channel shaped magnetic steel blocks 3, the output coils 6, a plurality of the magnetic short circuit blocks 5, and the support ring 10, all of which accommodated in the left half of the case 1.

Figure 3:
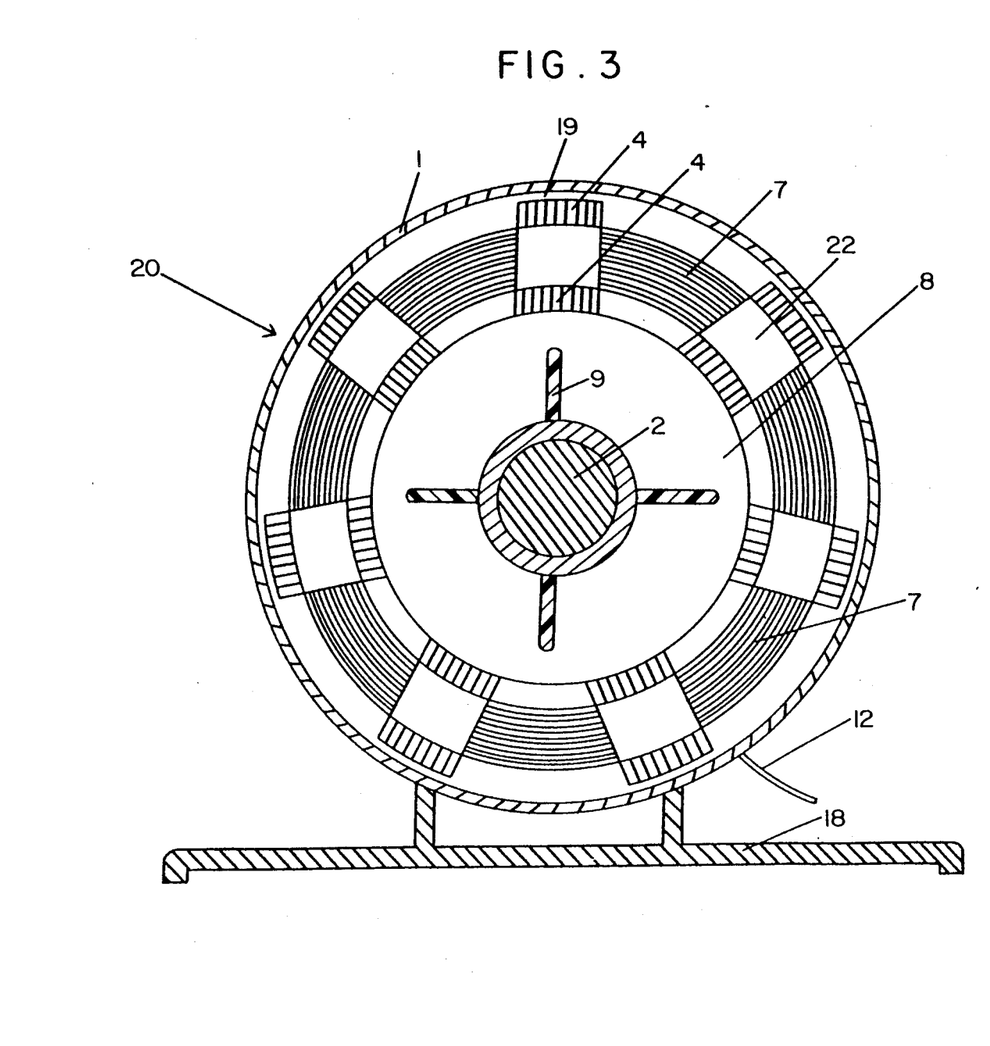
FIG. 3 is a sectional view taken along the line a—a of FIG. 1 as observed from the left hand side of FIG. 1, showing the rotor of the electric generator according to the present invention.

Reference code 20 generally indicates the rotor of the electric generator of the present invention, and this rotor 20 is accommodated in the right half of the case 1, and is fixedly secured on the shaft 2 concentrically. Specifically, a short cylindrical supporter 8 is fixedly installed on the shaft 2 so as to revolve together with the shaft 2, and a strong centrifugal fan 9 is disposed to the left of the supporter 8, being integrally formed with the supporter 8, and being accommodated to the left of the line a—a of FIG. 1 within the array of the blocks 3,5. The centrifugal fan 9 not only cools the different parts of the generator, but also reinforces the attachment of the supporter 8. That is, as the fan 9 is integrally formed and extended in the axial direction, any oscillations of the supporter 8 can be prevented. A second plurality of channel shaped magnetic steel blocks 4 are attached radially around the supporter 8 this second plurality of at certain uniform angular intervals. First plurality of channel shaped magnetic steel blocks 4 are provided in the same number as that of the channel shaped magnetic steel blocks 3, and the blocks 3,4 must be positioned in a matching relationship with each other. In the example shown in the drawings, the number of blocks 3,4 is respectively 7, but the numbers can be varied depending on the requirements. Field coils 7 are wound in a solenoidal form through the slots of the second plurality channel shaped magnetic steel blocks 4 which are installed in a radial form around the circumference of the supporter 8. The supporter 8 and the centrifugal fan 9 are made of a heat resistant high hardness synthetic resin such as polyimide or polyphenylene. The blocks 4 are attached onto the circumferential surface of the supporter 8 by means of bolts (not shown), and the field coils 7 are wound through the slots of the blocks 4, so that the attachments of the blocks 4 will become strongly secure. To further secure the attachments of the blocks 4, arcuate members (not shown) can be put between the blocks 4 along the circumference of the supporter 8 in order to reinforce the attachments of the blocks 4. The arcuate members installed respectively between the blocks 4 can be secured by means of bolts and the like.

The supporter 8, can be formed in a hollow type having casing reinforcing inner walls. Especially, in the case where polyimide is used as the material, the fabrication is by press sintering, and therefore, a hollow type casing with reinforcing inner walls will be unavoidable. Such a hollow type supporter 8 will also contribute to reducing the total weight of the generator.

After winding of the field coils 7 through the slots of the second plurality of channel type magnetic steel blocks 4, a fill member 22 is press-fitted into each mouth space of the slots of the blocks 4. These fill members 22 are made of a heat resistant synthetic resin such as polyimide or a high hardness wood, and the purpose of these fill members 22 is not only to maintain the position of the field coils 7 and to prevent the displacement of the field coils 7 upon receipt of a biasing force, but also for another role which will be described later when the operation of the device of the present invention will be described.

As described above, the rotor 20 consists of the supporter 8, the centrifugal fan 9, the field coils 7, a plurality of the second plurality of channel shaped magnetic steel blocks 4, and the fill members 22, all of them being fixedly installed around the shaft 2, and the rotor 20 is accomodated within the right half of the case 1 (refer to FIGS. 1 and 3). The second plurality of channel shaped magnetic steel blocks 4 are laminated in an aprroximately radial-axial direction (which is the direction perpendicular to the laminating direction of the conventional electric generators), while the material, the laminating method, and the binding method for these blocks 4 are same as those for the blocks 3 of the stator 21.

The case 1 is provided with an annular step 30 in the vicinity of the line a—a of FIG. 1, such that the portion of the case 1 accommodating the stator 21 has a larger thickness, and the portion of the case 1 accommodating the rotor 20 has a smaller thickness. The reason for such a difference of thickness provided in the circumferential wall of the case 1 is that, with the thicker wall, the case 1 is made to support the first plurality of channel shaped blocks 3 and the magnetic short circuit blocks 5 with greater strength, and with the thinner wall, the case 1 is made to provide a gap 19 between the rotor 20 and the case 1, the gap 19 being needed for the revolution of the rotor 20.

Reference 11 indicates an assembly of a slip ring and a brush, which is a moving contact for supplying electric currents to the revolving field coil 7, and as this is a known type of component, just a schematical illustration is made, 12 indicates an electric wire for supplying electric currents to the field coil 7, 13, an output electric wire for transmitting the produced electric power to the load, 14, an end face of the shaft 2, and the function of this face 14 will be described below when the function of the electric generator of the present invention will be described, 15 and 16 indicate ventilation openings for the cooling air, which are provided in pluralities in the opposite side walls of the case 1, 17, bearings for rotatably retaining the shaft 2, 18, a mounting base for supporting the electric generator, 24, a metal ring having a high level of hardness, which will be described further below.

Figure 4:
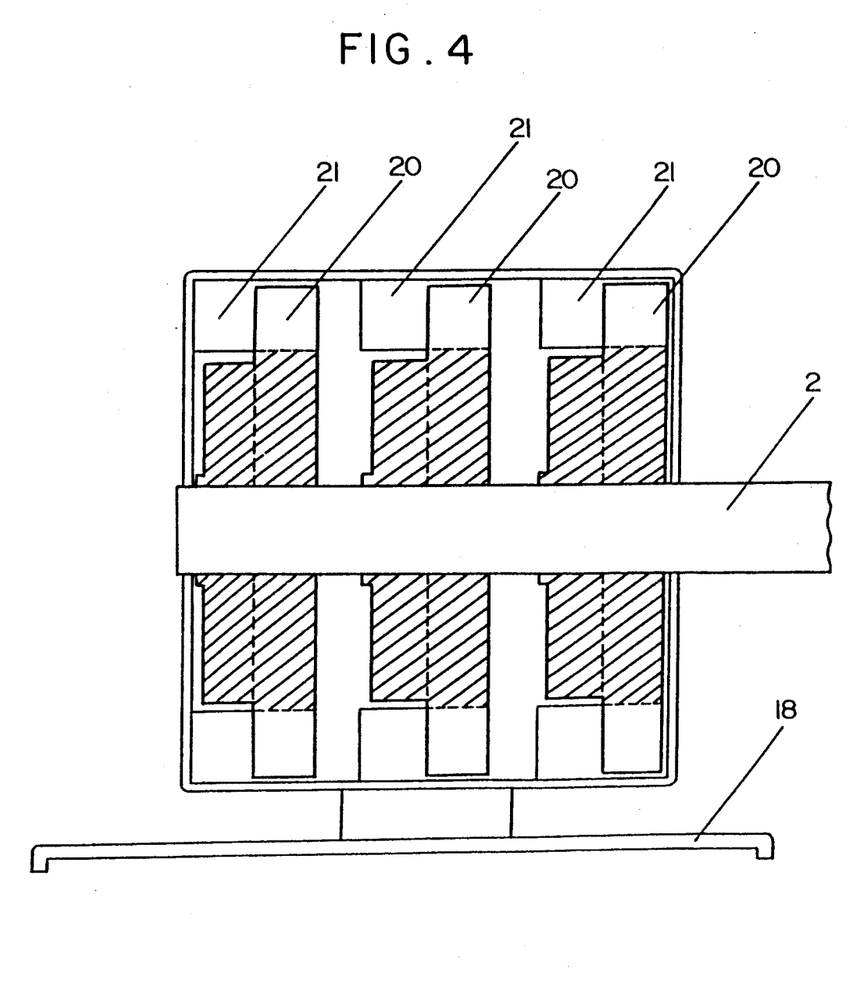
FIG. 4 is a schematical axial sectional view of a combination of the electric generators according to the present invention, in which a plurality of the generators are installed on a same shaft axially separated within the same case.

FIG. 4 shows a composite generator which contains a combination of a plurality of the electric generators of the present invention within the same case, the generators being installed on the same shaft axially separated. As will be described below, this composite generator can have various purposes and applications, and depending on the purposes and applications, the consitution of the composite generator will become slightly different. Therefore, FIG. 4 shows only the overall contour of the generator schematically, but not exactly or specifically.

Now the function and the operation of the solenoid type electric generator according to the present invention will be described. First, the rotor 20 together with the shaft 2 made to revolve by an external driving power, and at the same time, a dc current is fed through the wire 12 and the assembly of the slip ring and the brush to the field coil 7 to magnetize the second plurality of channel shaped magnetic steel blocks 4 of the rotor 20. At this instant, for example, if the blocks 4 of the rotor 20 and the blocks 3 of the stator 21 are at exactly matched positions as in the case of FIG. 1, the magnetization of the blocks 4 of the rotor 20 will induce the magnetization of the blocks 3 of the stator 21. During the process of the magnetization of the blocks 3 of the stator 21, the magnetic fluxes from the blocks 4 of the rotor 20 will cross the output coils 6 in a direction perpendicular to the output coils 6, that is, leftwardly in FIG. 1. Meanwhile, the magnetic fluxes which are produced when the blocks 3 of the stator 21 are magnetized will cross the output coils 6 in an opposite direction with an opposite polarity, that is, rightwardly in FIG. 1 with an opposite polarity. Therefore, the two kinds of the magnetic fluxes (from the blocks 3 and the blocks 4) with opposite polarities and with opposite crossing directions will produce an electromotive force in the output coil 6 in the same direction. At this instant, the magnetic circuit will be formed in a rectangular shape, the magnetic fluxes being connected through the blocks 4 and the blocks 3, to form a rectangular loop.

Further, in a state in which the dc current flows through the field coils 7, if the rotor 20 is revolved to a position at which the blocks 4 of the rotor 20 and the magnetic short circuit blocks 5 are exactly matched to each other, then the magnetic circuit is changed to another rectangular shape. That is, the magnetic fluxes are connected through the blocks 4 of the rotor 20 and the blocks 5 of the stator 21, thus forming a magnetic circuit of a rectangular loop of another shape. In this process, the blocks 3 of the stator 21 will lose their magnetizations, and during this demagnetizing process, the magnetic fluxes of the blocks 3 will return into the blocks 3. When the magnetic fluxes return, they will cross the output coils 6 in an opposite direction with the same polarity as before, thereby producing an electromotive force in the output coils 6 in an opposite direction. Meanwhile, in this process, the magnetic fluxes of the blocks 4, which had been connected through the blocks 3, will move to the blocks 5, and, in this process, the moving magnetic fluxes of the blocks 4 will cross the output coils 6 in an opposite direction, thereby producing an electromotive force in an opposite direction compared with before. Thus the two kinds of moving magnetic fluxes (of the blocks 3 and the blocks 4) will produce electromotive forces in the same direction.

Thus, in a state in which a dc current flows through the field coil 7, if the rotor 20 is made to revolve by an external driving force, single phase ac electromotive forces will be produced in the output coil 6. and the frequency will be determined by the number of the blocks and the revolution speed of the rotor 20.

The wave pattern of this ac electromotive force will be as follows. For example, if the blocks 4 of the rotor 20 approach the blocks 3 of the stator 21, a positive or negative electromotive force will be produced in the output coil 6, and after a speedy increase of the crossing of the magnetic fluxes, a peak of the electromotive force will be formed at a point where the crossing rate of the magnetic fluxes is largest. Then, if the blocks 4 of the rotor 20 are moved to a position where the blocks 4 of the rotor 20 are exactly matched with the magnetic blocks 3 of the stator 21, the electromotive force will be dropped to ground level momentarily.

Further, if the blocks 4 of the rotor 20 depart from the blocks 3 of the stator 21, and approach the magnetic short circuit blocks 5 of the stator 21, an electromotive force will be produced in an opposite direction. Again, a peak of the electromotive force will be formed at a point where the crossing rate of the magnetic fluxes is largest, and the electromotive force will drop to ground level momentarily as soon as the blocks 4 of the rotor 20 are moved to a position where the blocks 4 are exactly matched with the magnetic short circuit blocks 5 of the stator 21. Thus one cycle of the generation of the electromotive force is completed.

Now the reactance of the solenoid type electric generator according to the present invention will be described.

First, the reactance in a state without a load will be described. In a state without connecting the output power transmission line to a load, if a dc current is supplied to the field coil 7, and the rotor 20 is driven, the magnetic fluxes from the blocks 3,4,5 will cross the output and field coils 6,7. However, the output coil 6 is not affected by the magnetic fluxes in its current flow, because a current can not flow through the output coil 6. But the field coil 7 is affected by the magnetic fluxes during the first half cycle in such manner that the current flow in the field coil 7 is impeded, and during the next half cycle, the field coil 7 will be affected in such a manner that the current flow in the field coil 7 will be promoted. Accordingly, if the positive influence and the negative influence are offset each other, the net result will be only ripples formed in the dc flowing through the field coil 7.

Meanwhile, to understand the aspect of the magnetodynamic interactions between the different steel blocks, under an unloaded state the interactions between the different magnetic blocks are produced only in the form of attractions, and further, because the blocks 3,5 of the stator 21 are closely positioned to each other, the interactions can produce only a ripple type influence to the revolution of the rotor 20. In other words, a revolution impeding force slightly prevails at some moment, and a revolution promoting force will slightly prevail at another moment, thus there being no net positive impeding influence. Thus, in a state without a load applied, the power loss will be composed of the mechanical frictional loss, the air blow power consumption, the resistance loss of the field coil 7, the hysteresis loss of the stator, and the eddy current loss of the stator.

Meanwhile, if a load is connected to the output coil, the situation will become different. For example, if the blocks 4 of the rotor 20 are displaced from the magnetic short circuit blocks 5 and approach the blocks 3 of the stator 21, a current having a direction opposite to that of the field coil 7 will be produced in the output coil 6, and therefore, the blocks 3 of the stator 21 will establish magnetic fields having forces repulsing the the magnetic fields of the blocks 4 of the rotor 20, so that the crossing of the magnetic fluxes of the blocks 4 of the rotor 20 across the output coil 6 will be impeded, thereby restricting the peak voltage of the output coil 6. But if the blocks 4 of the rotor 20 are moved to a position where the blocks 4 are exactly mated with the blocks 3 of the stator 21, the current flow in the output coil 6 is momentarily stopped to be reversed to an opposite polarity. However, at this moment, it is desired that the blocks 3 of the stator 21 are all magnetized in the same polarity as the blocks 4 of the rotor 20, and that all the magnetic fluxes of the blocks 4 and the blocks 3 have crossed the output coil 6. Therefore, only the peak current will be restricted. Meanwhile, the influence by the current of the output coil 6 on the current of the field coil 7 will be considerable, but the former can not suppress the latter, because the former can exist as long as the latter exists.

Meanwhile, to understand the magnetodynamic interactions between the different blocks 3,4,5, under a loaded state if blocks 4 of the rotor 20 are displaced from the magnetic short circuit blocks 5 and are approaching the blocks 3, the current produced in the output coil 6 will cause the blocks 3 of the stator 21 to be magnetized in such a polarity that the approaching of the blocks 4 to the blocks 3 will be impeded due to the repulsing interactions between the two kinds of the blocks 3,4, while current produced in the output coil 6 will cause the blocks 5 of the stator 21 to be magnetized in such a polarity that the departing of the blocks 4 from the blocks 5 will be impeded due to the attracting interactions between the two kinds of blocks 4,5. Accordingly, the net result will be an overall impeding of the revolutions of the rotor 20. Further, if the blocks 4 of the rotor 20 pass the position where the blocks 4 are exactly matched with the blocks 3, and if the blocks 4 further advance toward the magnetic short circuit blocks 5, then the direction of the electric current in the output coil 6 is reversed, and at the same time, the magnetic polarities of the blocks 3,5 of the stator are also reversed, so that the revolution of the rotor 20 should be again impeded.

If electromotive forces and electric currents are to be obtained, the above described magnetodynamic impeding forces must be overcome continuously by forcibly driving the rotor 20 by an external force. The process of overcoming of such impeding forces is not an unnecessary task, but is a proper process by which the dynamic energy of the rotor is transformed into an electric energy.

As described above, the attractive and repulsive forces are produced almost simultaneously between the blocks, but such forces will create fluctuations of biasing forces in the axial directions repeatedly momentarily. Further, during the idle operation under a noload condition, the rotor 20 will receive continuosly biasing forces in the axial direction leftwardly in FIG. 1. Thus if the shaft 2 and the rotor 20 receive a biasing force in the leftward direction (as viewed in FIG. 1), the end face 14 of the shaft 2 in cooperation with the contact face of the case 1 will prevent the displacement of the shaft 2 in the leftward axial direction, while, if the shaft 2 and the rotor 20 receives a right biasing force (which will occur momentarily), the ring 24 will prevent the rightward displacement of the shaft 2. Accordingly, the parts functioning to prevent the axial displacements of the shaft 2 (such as the end face 14, the contact face, the ring 24 and the contacting face) should be properly heat-treated, and should be provided with grease grooves.

Now the cooling principle of the solenoid type electric generator according to the present invention will be briefly described. The centrifugal fan 9 which strongly reinforces the attachment state of the short cylindrical supporter 8 performs a strong cooling function. Further, the blocks 3,4,5 are substantially separated from each other in their radially outward portions, and the coils 6,7 have considerably large exposed portions (FIGS. 2 and 3). Therefore, the air entering through the openings 15 and leaving through the openings 16 by the strong driving action of the centrifugal fan 9 will effectively cool the different parts of the generator. Since the coils 6,7 can be effectively cooled, and can be operated at a low temperature, not only can the life expectancy of the coils 6,7 can be extended, but also the resistance loss of the coils 6,7 can be reduced, thereby improving the power efficiency of the generator.

Meanwhile, the shaft 2 is substantially separated from the coils 6, 7 because the fan 9 and the supporter 8 occupy a considerably large space around the shaft 2, and the shaft 2 is partially shielded from the coils 6,7 by the blocks 3,4. Therefore, the hysteresis loss and eddy current loss which otherwise would occur in the shaft 2 can be substantially avoided.

The case 1 and the cap 23 may be desirably made of a non-magnetic metal such as aluminum so that the hysteresis loss due to stray magnetic fluxes could be avoided, but in the case where the release of stray magnetic fluxes to the outside is not desirable, steel should be used.

If the coils 6,7 receive biasing forces in the axial directions as a part of the magnetodynamic interactions as described above, the magnetic short circuit blocks 5 of the stator 21 will prevent the rightward displacement of the coil 6, and the fill members 22 will prevent the leftward displacement of the field coil 7. The fill members 22 perform another function as described below. That is, if a dc current flows through the field coil 7, the blocks 3 of the stator 21 are placed under the influence of the dc current. Such a phenomenon is not advantageous for increasing the electromotive force in the output coil 6, because the repeatedly crossing number of the magnetic fluxes across the output coil 6 is greatly reduced. The fill members 22 keep the field coil 7 away from the blocks 3, 5 of the stator 21 as far as possible, so that the influence of the field coil 7 to the blocks 3, 5 of the stator 21 is reduced.

Now the second embodiment of the present invention will be described. This second embodiment is exactly the same as the first embodiment of the present invention as described above, except that the field coil 7 and the fill members 22 are removed, and permanent magnets having exactly the same shape as the inversely laid down channel shaped blocks 4 are used in place of the said blocks 4. As the material of the permanent magnets, ferrite or magnetic metals can be used.

In the first and second embodiments of the present invention as described above, there is no particular limitation in the number of the blocks of the rotor and stator, as long as each kind of the blocks of the stator and the blocks of the rotor are indentical to each other in their numbers, positions and opposing faces.

In the first embodiment of the present invention, a part of the output of the generator can be supplied to the field coil 7 after rectifying it as in the case of the conventional generators.

Further, in the first and second embodiments described above, the functions of the stator and rotor can be exchanged each other, in such a manner that the stator has a field coil and the rotor has an output coil for delivering an output power.

As mentioned above, FIG. 4 shows a composite generator in which a plurality of the solenoid type electric generators according to the first or second embodiment of the present invention are arranged within the same case and on the same shaft axially separated from each other. This drawing does not show the exact constitution, but only presents a rough contour. The purpose of such a composite generator is to step up the output voltage by connecting the element generators in series, or to draw a constant dc current without ripple by arranging different phases to the different element generators, by rectifying each output of the element generators. and by connecting in parallel the rectified outputs. In the case of the latter purpose, complementary processes will have to be applied after rectifying each of the outputs and before the parallel combination of the said rectified outputs. In this case the advantage of the composite generator is that large capacitors usually required in such a process for translating the phases can be removed. Still another purpose of the composite generator of FIG. 4 is that electric currents of different frequencies can be drawn from the different element generators within the composite generator by providing different numbers of the magnetic blocks to the different element generators.

Descriptions are made in the above based on the embodiments of the present invention, but it should be understood that various changes and modifications can be added to the embodiments of the present invention without departing from the scope of the present invention which is defined in the attached claims of the present invention.

What is claimed is:

1. A solenoid type electric generator comprising:
    a shaft;
    a cylindrical case;
    a case cap being fixed to said case;
    a rotor; and
    a stator;
    said cylindrical case having an annular step in the middle thereof and attached concentrically on said shaft, said annular step separating said case into first and second length portions, a circumferential wall of said case having a thicker cross section at said first length portion than at said second length portion;
    said stator comprising:
        a first plurality of channel shaped magnetic metal blocks attached on an inner circumferential surface of the first length portion of said circumferential wall of said case at predetermined uniform angular intervals each of said first plurality of metal blocks having a slot defined by a channel;
        an output coil wound in a short solenoidal form through the slots of said first plurality of channel shaped magnetic metal blocks;
        a plurality of magnetic short circuit blocks of a flat plate shape disposed between said channel shaped magnetic metal blocks and attached on the inner circumferential surface of the first length portion of said circumferential wall of said case to rigidly support said output coil, said first plurality of channel shaped magnetic metal blocks and said magnetic short circuit blocks having inner end faces being parallel to a length of said shaft and being positioned on a common plane, and further including radially facing inner tips of first plurality of channel shaped metal blocks and said magnetic short circuit blocks;

a support ring connecting the radially facing inner tips of said first plurality of channel shaped magnetic metal blocks and said magnetic short circuit blocks to reinforce a connection of said first plurality of metal blocks to said short circuit blocks;

said rotor comprising:

a cylindrical supporter concentrically installed on said shaft in the space within the second length portion of said case;

a centrifugal fan integrally formed with said cylindrical supporter and disposed within said first length portion of said case for cooling the generator and for reinforcing the attachment of said short cylindrical supporter;

a second plurality of channel shaped magnetic metal blocks attached around said cylindrical supporter at predetermined uniform angular intervals and having radially facing outward faces, each of said second plurality of metal blocks have a slot defined by a channel, said second plurality of channel shaped magnetic metal blocks and said first plurality of channel shaped magnetic metal blocks being identical in number and in their relative positions;

a field coil wound in a short solenoidal form through the slots of said second plurality of channel shaped magnetic metal blocks;

a plurality of fill members respectively press-fitted into the slots of said second plurality of channel shaped magnetic metal blocks for preventing displacement of said field coil and for maintaining said field coil at least a predetermined distance from said first plurality of channel shaped magnetic metal blocks and said magnetic short circuit blocks;

a hard metal ring fixed to an end of said shaft proximate said rotor for prevention of the axial displacements of said shaft and said rotor, a preset air gap being provided between mating faces of said first plurality of channel shaped magnetic metal blocks and said second plurality of channel shaped magnetic metal blocks, a minimum clearance being also provided between the radially facing outward faces of said second plurality of channel shaped magnetic metal blocks and the inner circumferential surface of the first length portion of said case.

2. The solenoid type electric generator as claimed in claim 1, wherein said first plurality of channel shaped magnetic metal blocks, said short circuit magnetic metal blocks and said second plurality of channel shaped magnetic metal blocks are laminated in radial-axial direction.

3. The solenoid type electric generator as claimed in claim 1, wherein said cylindrical supporter, said centrifugal fan and said support ring are made of a high hardness heat resistant non-magnetic synthetic resin, and said shaft of the generator is disposed in such a manner as not to be influenced by said output and field coils because the space occupied by said short cylindrical supporter and said centrifugal fan is greater than the axial lengths of said coils and said coils being partially shielded by said magnetic metal blocks.

4. The solenoid type electric generator as claimed in claim 3, wherein said
short cylindrical supporter forms a hollow cylinder having a plurality of reinforcing inner walls.

5. The solenoid type electric generator as claimed in claim 1, wherein
said fill members are made of a high hardness wood or a high hardness heat resistant non-conductive non-magnetic synthetic resin.

6. The solenoid type electric generator as claimed in claim 1, and further comprising permanent magnets replacing said second plurality of channel shaped magnetic metal blocks, said field coil and said fill members, said permanent magnets being made of a ferrite through the process of press sintering or made of metallic permanent magnets.

7. The solenoid type electric generator as claimed in claim 1, wherein the functions of said stator and rotor are exchanged, said rotor having an output coil and said stator having a field coil.

8. the solenoid type electric generator as claimed in claim 1, and further comprising arcuate members fixed between adjacent ones of said second plurality of channel shaped magnetic metal blocks to reinforce the attachment thereof.

9. A composite generator comprising:

a shaft;

a case;

a plurality of generators positioned within said case and installed on said shaft axially separated each other, each of said generators comprising:

a stator comprising:

a first plurality of channel shaped magnetic blocks attached on an inner circumferential surface of said case at predetermined uniform angular intervals, each of said first plurality of channel shaped magnetic metal blocks having a slot defined by a channel;

an output coil wound in a short solenoidal form through the slots of said first plurality of channel shaped magnetic metal blocks; and a plurality of magnetic short circuit blocks disposed between said channel shaped magnetic metal blocks; and a rotor comprising:

a cylindrical supporter concentrically installed on said shaft;

a second plurality of channel shaped magnetic blocks attached around said cylindrical supporter at predetermined uniform angular intervals, said second plurality of channel shaped magnetic metal blocks and said first plurality of channel shaped magnetic metal blocks being identical in number and in their relative positions, each of said second plurality of channel shaped magnetic metal blocks having a slot defined by a channel;

a field coil wound in a short solenoidal form through the slots of said second plurality of channel shaped magnetic blocks; and a plurality of fill members respectively press-fitted into the slots of said second plurality of channel shaped magnetic blocks for preventing displacement of said field coil and for maintaining said field coil at least a predetermined distance from said first plurality of channel shaped magnetic blocks and said magnetic short circuit blocks.

10. A solenoid type electric generator comprising:
a shaft;
a cylindrical case having an annular step in the middle thereof for being attached concentrically on said shaft, said annular step separating said case into first and second length portions;
a stator comprising:
   a first plurality of channel shaped magnetic blocks each having a slot defined by a channel and attached on an inner circumferential surface of the first length portion of said case at predetermined uniform angular intervals;
   an output coil wound in a short solenoidal form through the slots of said first plurality of channel shaped magnetic blocks; and
   a plurality of magnetic short circuit blocks each disposed between said channel shaped magnetic blocks and attached on the inner circumferential surface of the first length portion of said case so as to rigidly support said output coil; and
a rotor comprising:
   a cylindrical supporter concentrically installed on said shaft in the space within the second length portion of said case;
   a second plurality of channel shaped magnetic blocks each having a slot defined by a channel and attached around said cylindrical supporter at predetermined uniform angular intervals and having outward faces, said second plurality of channel shaped magnetic blocks and said first plurality of channel shaped magnetic blocks being identical in number and in their relative positions;
   a field coil wound in a short solenoidal form through the slots of said second plurality of channel shaped magnetic blocks; and
   a plurality of fill members respectively press-fitted into the slots of said second plurality of channel shaped magnetic blocks for preventing displacement of said field coil and for maintaining said field coil at least a predetermined distance from said first plurality of channel blocks.

11. The solenoid type generator of claim 10, and further comprising a centrifugal fan disposed within said first length portion of said case and integrally formed with said cylindrical supporter for cooling the generator.

12. The solenoid type generator of claim 10, wherein said circumferential wall of said casing has a greater cross section at said first length portion than at said second length portion.

13. The solenoid type generator of claim 10, and further comprising a cap fixed to one end of said case.

14. The solenoid type generator of claim 10, and further comprising a hard metal ring fixed to an end of said shaft proximate said rotor for preventing axial movement of said shaft relative to said rotor.

15. The solenoid type generator of claim 10, and further comprising a preset air gap between mating faces of said first plurality of channel shaped blocks and said second plurality of channel shaped blocks.

* * * * *